(12) United States Patent
Ditchfield et al.

(10) Patent No.: US 10,742,494 B2
(45) Date of Patent: Aug. 11, 2020

(54) SYSTEM AND METHOD FOR CONFIGURING AT LEAST ONE SENSOR SYSTEM OF A VEHICLE

(71) Applicant: VEONEER US, INC., Southfield, MI (US)

(72) Inventors: Andrew Ditchfield, New Hudson, MI (US); Julian Schmied, Schweinfurt (DE); Stefan Eisenmann, Schweinfurt (DE)

(73) Assignee: VEONEER US, INC., Southfield, MI (US)

( * ) Notice: Subject to any disclaimer, the term of this patent is extended or adjusted under 35 U.S.C. 154(b) by 72 days.

(21) Appl. No.: 15/499,298

(22) Filed: Apr. 27, 2017

(65) Prior Publication Data

US 2018/0316554 A1    Nov. 1, 2018

(51) Int. Cl.
| | | |
|---|---|---|
| *H04L 12/24* | (2006.01) | |
| *H04L 29/08* | (2006.01) | |
| *G07C 5/08* | (2006.01) | |
| *G01C 21/20* | (2006.01) | |
| *G06N 20/00* | (2019.01) | |

(52) U.S. Cl.
CPC .......... *H04L 41/0813* (2013.01); *G01C 21/20* (2013.01); *G06N 20/00* (2019.01); *G07C 5/08* (2013.01); *H04L 67/12* (2013.01)

(58) Field of Classification Search
CPC ..... H04L 41/0813; H04L 67/12; G01C 21/20; G06N 99/0005; G07C 5/08
See application file for complete search history.

(56) References Cited

U.S. PATENT DOCUMENTS

| | | | |
|---|---|---|---|
| 6,882,283 B1* | 4/2005 | Eslambolchi | E02F 5/102 340/686.2 |
| 8,190,336 B2 | 5/2012 | Verkuilen et al. | |
| 8,275,506 B1* | 9/2012 | Bishel | A01D 34/008 701/25 |
| 9,238,483 B2* | 1/2016 | Hafner | B62D 13/06 |
| 9,238,569 B2* | 1/2016 | Sorensen | B66C 23/185 |
| 9,265,187 B2* | 2/2016 | Cavender-Bares | A01C 7/00 |

(Continued)

FOREIGN PATENT DOCUMENTS

JP    2007-254997 A    10/2007

*Primary Examiner* — Blake J Rubin
(74) *Attorney, Agent, or Firm* — Dickinson Wright PLLC

(57) ABSTRACT

A system for configuring at least one sensor system of a vehicle includes a processor, at least one sensor, and a memory device. The processor is configured to execute the method that includes the steps of, during a learning mode, receiving signals from the at least one sensor regarding one or more objects attached to the vehicle, storing in a memory device at least one location of one or more objects attached to the vehicle in the memory and detected by the at least one sensor. In an operating mode, the method includes the steps of receiving signals from the at least one sensor regarding the location of one or more objects external to the vehicle, determining if the location of any of the objects external to the vehicle are different from the locations of any objects stored in the memory device during the learning mode, and reporting to a vehicle system when one or more objects external to the vehicle have a one or more locations different from the locations stored in the memory device during the learning mode.

20 Claims, 14 Drawing Sheets

(56) References Cited

U.S. PATENT DOCUMENTS

| | | | |
|---|---|---|---|
| 9,290,203 B2* | 3/2016 | Lavoie | B62D 13/06 |
| 9,315,212 B1* | 4/2016 | Kyrtsos | B62D 13/06 |
| 9,381,916 B1* | 7/2016 | Zhu | G01S 13/931 |
| 9,554,508 B2* | 1/2017 | Balutis | A01D 34/008 |
| 2005/0195383 A1* | 9/2005 | Breed | B60R 21/233 |
| | | | 356/4.01 |
| 2008/0262669 A1* | 10/2008 | Smid | G05D 1/0278 |
| | | | 701/23 |
| 2008/0263910 A1* | 10/2008 | Schoenmaker | E02F 3/439 |
| | | | 37/348 |
| 2008/0263912 A1* | 10/2008 | Gharsalli | E02F 3/844 |
| | | | 37/382 |
| 2010/0215469 A1* | 8/2010 | Trifunovic | E02F 3/432 |
| | | | 414/699 |
| 2011/0029279 A1* | 2/2011 | McAree | E02F 3/435 |
| | | | 702/150 |
| 2011/0153167 A1* | 6/2011 | Kahle | E02F 3/32 |
| | | | 701/50 |
| 2011/0166705 A1* | 7/2011 | Anderson | A01D 34/008 |
| | | | 700/253 |
| 2012/0083960 A1* | 4/2012 | Zhu | B60T 8/17 |
| | | | 701/23 |
| 2013/0168499 A1* | 7/2013 | Grossman | B64F 5/50 |
| | | | 244/135 A |
| 2013/0169425 A1 | 7/2013 | Victor et al. | |
| 2013/0265189 A1* | 10/2013 | Chang | G01S 17/87 |
| | | | 342/52 |
| 2014/0284118 A1* | 9/2014 | Van Mill | B65G 43/00 |
| | | | 177/1 |
| 2015/0077557 A1* | 3/2015 | Han | B60R 11/04 |
| | | | 348/148 |
| 2015/0085123 A1 | 3/2015 | Tafazoli Bilandi et al. | |
| 2015/0101519 A1* | 4/2015 | Blackwell | A01B 59/002 |
| | | | 111/200 |
| 2015/0105965 A1* | 4/2015 | Blackwell | A01B 59/002 |
| | | | 701/28 |
| 2015/0105974 A1* | 4/2015 | Kleve | B60W 10/00 |
| | | | 701/36 |
| 2015/0189830 A1* | 7/2015 | Jagenstedt | G05D 1/0265 |
| | | | 701/26 |
| 2015/0220086 A1* | 8/2015 | Willgert | G05D 1/0214 |
| | | | 701/26 |
| 2015/0240453 A1* | 8/2015 | Jaliwala | E02F 9/2041 |
| | | | 701/50 |
| 2015/0241546 A1* | 8/2015 | Boyle | G11B 27/034 |
| | | | 382/103 |
| 2015/0308070 A1* | 10/2015 | Deines | E02F 3/434 |
| | | | 701/50 |
| 2015/0362921 A1* | 12/2015 | Hanaoka | G01B 11/24 |
| | | | 701/23 |
| 2016/0031447 A1* | 2/2016 | Kobayashi | G05B 19/042 |
| | | | 701/50 |
| 2016/0150739 A1* | 6/2016 | Fisher | A01D 34/008 |
| | | | 705/14.4 |
| 2017/0013773 A1* | 1/2017 | Kirk | A01B 79/005 |
| 2017/0034983 A1* | 2/2017 | Couchman | A01B 3/56 |
| 2017/0055433 A1* | 3/2017 | Jamison | G05D 1/104 |
| 2017/0068259 A1* | 3/2017 | Patz | G01L 3/1478 |
| 2017/0088132 A1* | 3/2017 | Sagemueller | A01B 69/008 |
| 2017/0114519 A1* | 4/2017 | Hague | E02F 3/434 |
| 2017/0127607 A1* | 5/2017 | Mannefred | G05D 1/0044 |
| 2017/0160748 A1* | 6/2017 | Nakagawaa | A01B 69/00 |
| 2017/0177003 A1* | 6/2017 | Yokoyama | G05D 1/0295 |
| 2017/0251589 A1* | 9/2017 | Tippery | A01G 22/00 |
| 2017/0316692 A1* | 11/2017 | Rusciolelli | G08G 1/164 |
| 2017/0364088 A1* | 12/2017 | Grufman | A01D 34/008 |
| 2018/0035606 A1* | 2/2018 | Burdoucci | A01D 34/008 |
| 2018/0080193 A1* | 3/2018 | Myers | E02F 3/34 |
| 2018/0101956 A1* | 4/2018 | Elkins | G06T 7/001 |
| 2018/0154899 A1* | 6/2018 | Tiwari | B60W 10/18 |
| 2018/0229701 A1* | 8/2018 | Tudosie | B60T 8/1708 |
| 2018/0253096 A1* | 9/2018 | Holgersson | A01D 34/008 |
| 2018/0313063 A1* | 11/2018 | Elkins | E02F 9/264 |
| 2018/0321682 A1* | 11/2018 | Matsumoto | G05D 1/0212 |
| 2018/0361584 A1* | 12/2018 | Williams | B25J 9/1679 |
| 2019/0049968 A1* | 2/2019 | Dean | A61G 5/04 |
| 2019/0053417 A1* | 2/2019 | Beaujot | A01B 63/002 |
| 2019/0065864 A1* | 2/2019 | Yu | G06K 9/00791 |

* cited by examiner

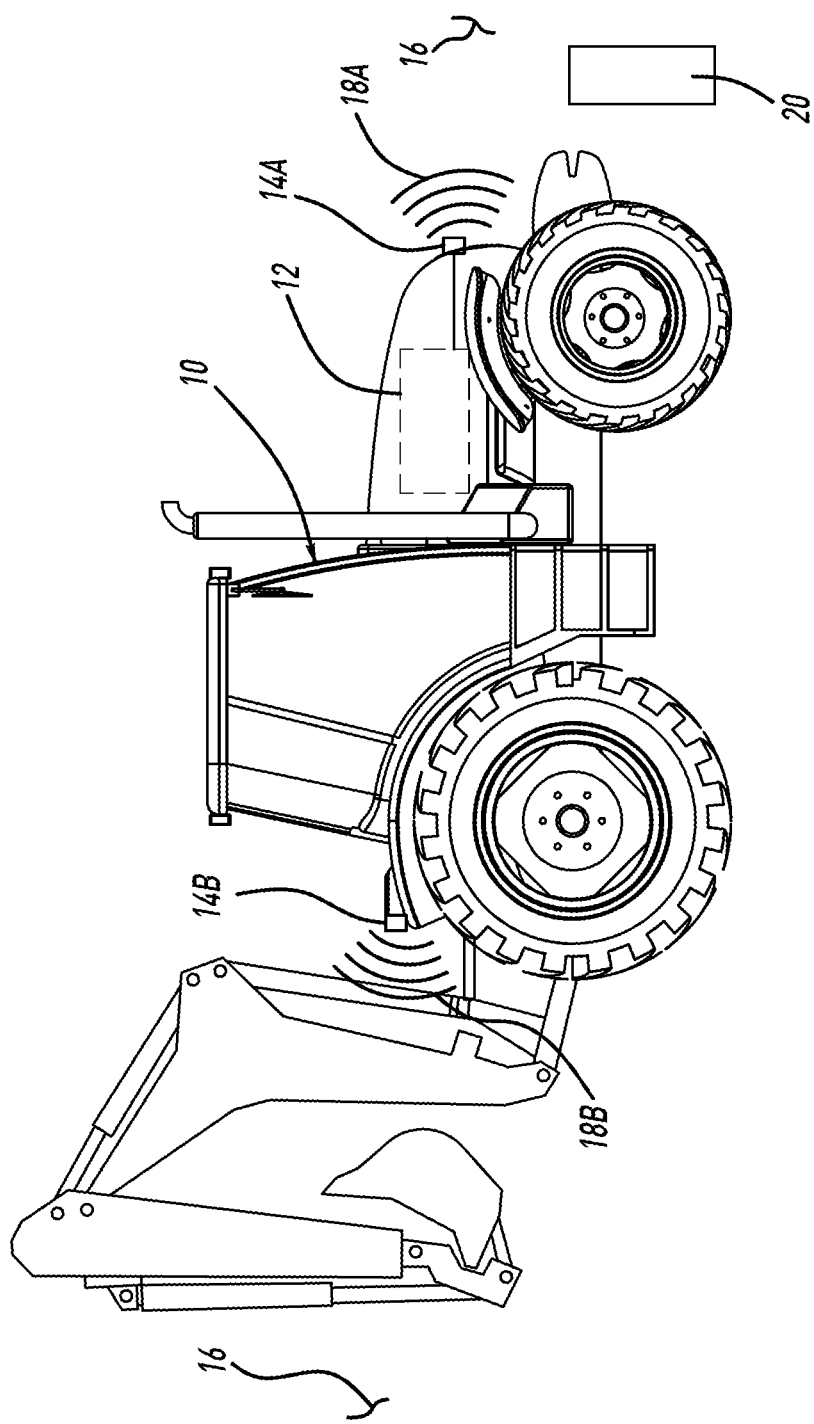

SYSTEM AND METHOD FOR CONFIGURING AT LEAST ONE SENSOR SYSTEM OF A VEHICLE

BACKGROUND

1. Field of the Invention

The present invention generally relates to systems and methods for configuring at least one sensor system of a vehicle. More specifically, the invention relates to configuring sensor systems for vehicles that may utilize removable accessories.

2. Description of Related Art

Vehicles, such as automobiles, light trucks, heavy-duty trucks, tractors, mining trucks, farm vehicles, etc. have been equipped with sensor systems to detect the location of objects external to the vehicle. For example, some vehicles include sensor systems that when detecting an external object near the vehicle will provide a warning to the operator of the vehicle. This warning may be in the form of a visual, audible, and/or tactile feedback to the operator. Furthermore, the detection of an external object near the vehicle may also actuate certain vehicle safety systems, such as braking or steering systems, to minimize or prevent any collision with the detected external object.

However, vehicles, especially vehicles that are made to be utilized with external accessories, such as farm tractors or construction vehicles routinely have different accessories attached to the vehicle. For example, a farm tractor may have a plow located in front of and/or behind the tractor. Construction vehicles may also have certain accessories attached to them, such as backhoes and shovels. As to automobiles, light trucks and heavy-duty trucks, these vehicles may also have certain accessories attached to them as well. For example, some automobiles may have a trailer or storage unit attached to the rear of the vehicle. Furthermore, some trucks may include snowplow equipment attached to the front and/or rear of the vehicle. It should be understood that the above examples are merely examples and there could be anyone of a number of different configurations between different vehicles and different accessories. Furthermore, it should be understood that a vehicle may be attached to more than one accessory.

When one or more accessories are attached to the vehicle, the sensor system for the vehicle may provide to the operator or other vehicle system false positives regarding the presence of external objects. For example, in the case of a construction vehicle, the sensor for detecting external objects may be detecting an accessory that is attached to the vehicle, such as a backhoe or shovel. This creation of false positives reduces the effectiveness of the sensor system because the operator of the vehicle may think that any warning provided to the operator is false. Furthermore, in vehicles that control one or more safety systems, the safety systems may be unnecessarily actuated when an accessory is attached to a vehicle because the system believes that the accessory is an external object and is attempting to prevent any collision with the external object.

SUMMARY

A system for configuring at least one sensor system of a vehicle includes a processor, at least one sensor, and a memory device. The processor is configured to execute the method that may include the steps of, during a learning mode, receiving signals from the at least one sensor regarding one or more objects attached to the vehicle, storing in a memory device at least one location of one or more objects attached to the vehicle and detected by the at least one sensor.

In an operating mode, the method may include the steps of receiving signals from at least one sensor regarding the location of one or more objects external to the vehicle, determining if the location of any of the objects external to the vehicle are different from the locations of any objects stored in the memory device during the learning mode, and reporting to a vehicle system when one or more objects external to the vehicle have a one or more locations different from the locations stored in the memory device during the learning mode.

The method may also involve creating a two-dimensional data structure that is a representation of the area external to the vehicle. The two-dimensional data structure may be a grid having a plurality of grid elements. Here, during the learning mode, the method may include the steps of receiving signals from the at least one sensor of the area external from the vehicle and marking the grid elements of the grid with an indicator when the one or more objects attached to the vehicle are present in the area the grid element represents. During the operating mode, the method may include the steps of receiving signals from the at least one sensor of the area external from the vehicle and determine when at least one object is present in the area where a grid element is unmarked. After that, the method may report to the vehicle system when at least one object is present in the area where the grid elements are unmarked.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIGS. 1A-1D illustrate different examples of vehicles and attached accessories incorporating the system for configuring one or more sensors of the vehicle;

DETAILED DESCRIPTION

Figure 1A:
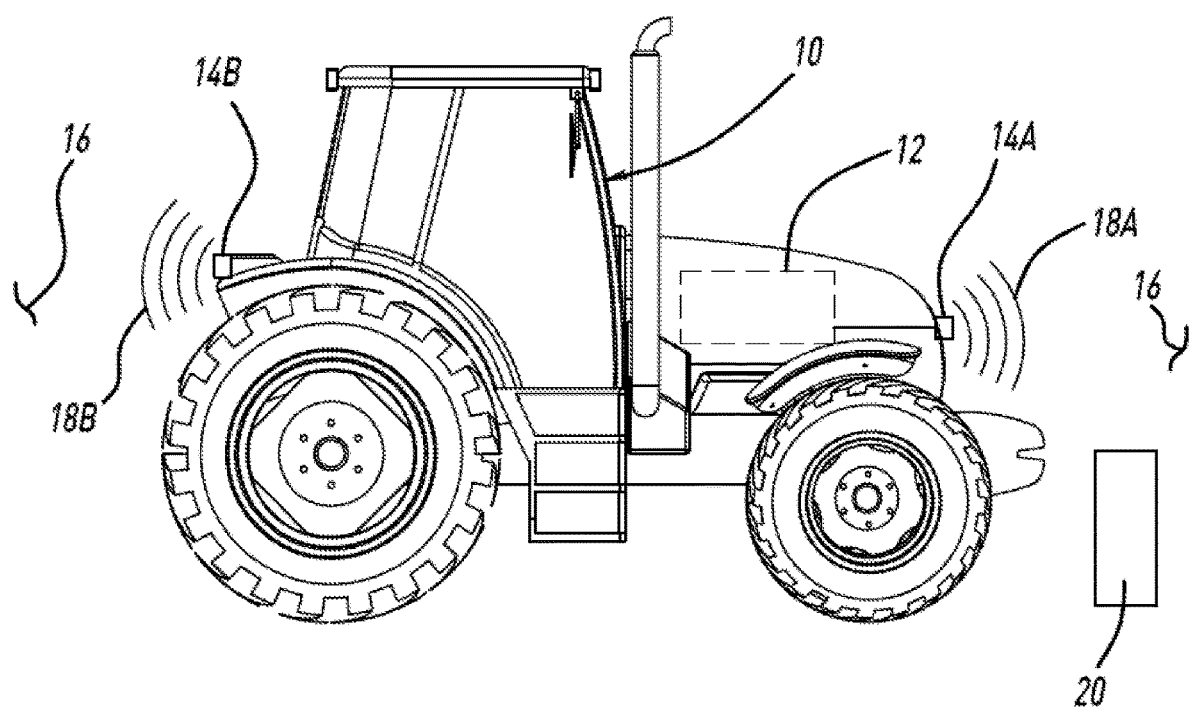

Referring to FIG. 1A, illustrated is a vehicle 10 having a system 12 for configuring one or more sensors 14A and 14B of the vehicle 10. In this example, the system 12 is located within a vehicle 10. It should be understood that the components making the system 12 could be located anywhere in, on, or near the vehicle 10. Further, it should be understood that the system 12 could take any one of a number of different forms. For example, the system 12 could be packaged within an electronic component type housing or could be distributed throughout the vehicle 10. Further, the system 12 may also utilize sensors already found in the vehicle 10. For example, the sensors 14A and/or 14B may already be part of the vehicle and the system 12 merely utilizes the sensors.

Here, the vehicle 10 is a construction vehicle. It should be understood that the vehicle 10 may be any type of vehicle capable of moving between two separate points. As such, while the vehicle 10 is illustrated to be a construction vehicle, it should be understood that the vehicle 10 may be any vehicle, such as a tractor, automobile, light truck, heavy-duty truck, tractor trailer, and the like. Furthermore, it should be understood that the vehicle 10 may not be limited to just land based vehicles, but could also include non-land based vehicles such as airplanes and boats.

As stated before, the vehicle 10 includes the system 12 for configuring at least one sensor of the vehicle 10. In this embodiment, the vehicle 10 includes two sensors 14A and 14B. Of course, it should be understood that the vehicle 10 may have any one of a number of different sensors. The sensors 14A and 14B may be in communication with the system 12. The sensors 14A and 14B are capable of scanning an area 16 that the vehicle 10 is operating in.

The sensors 14A and/or 14B may be any type of sensor capable of detecting objects in the area 16. For example, the sensors 14A and/or 14B may be radar sensors capable of transmitting and receiving radar signals 18A and 18B. These radar signals 18A and 18B may come into contact with an external object, wherein they are reflected from the external object and returned to the sensors 14A and/or 14B. In this example, the radar signals 18A come into contact with external object 20 which then bounces at least a portion of these signals back to the sensor 14A.

Of course, it should be understood that any type of sensor could be utilized. As such, the sensors 14A and/or 14B may be cameras, infrared detectors, or any type of sensor capable of detecting an external object. Furthermore, it should be understood that while multiple sensors may be utilized, the multiple sensors may include more than one type of sensor. So, for example, the sensors could include both a camera and a radar sensor.

Figure 1B:
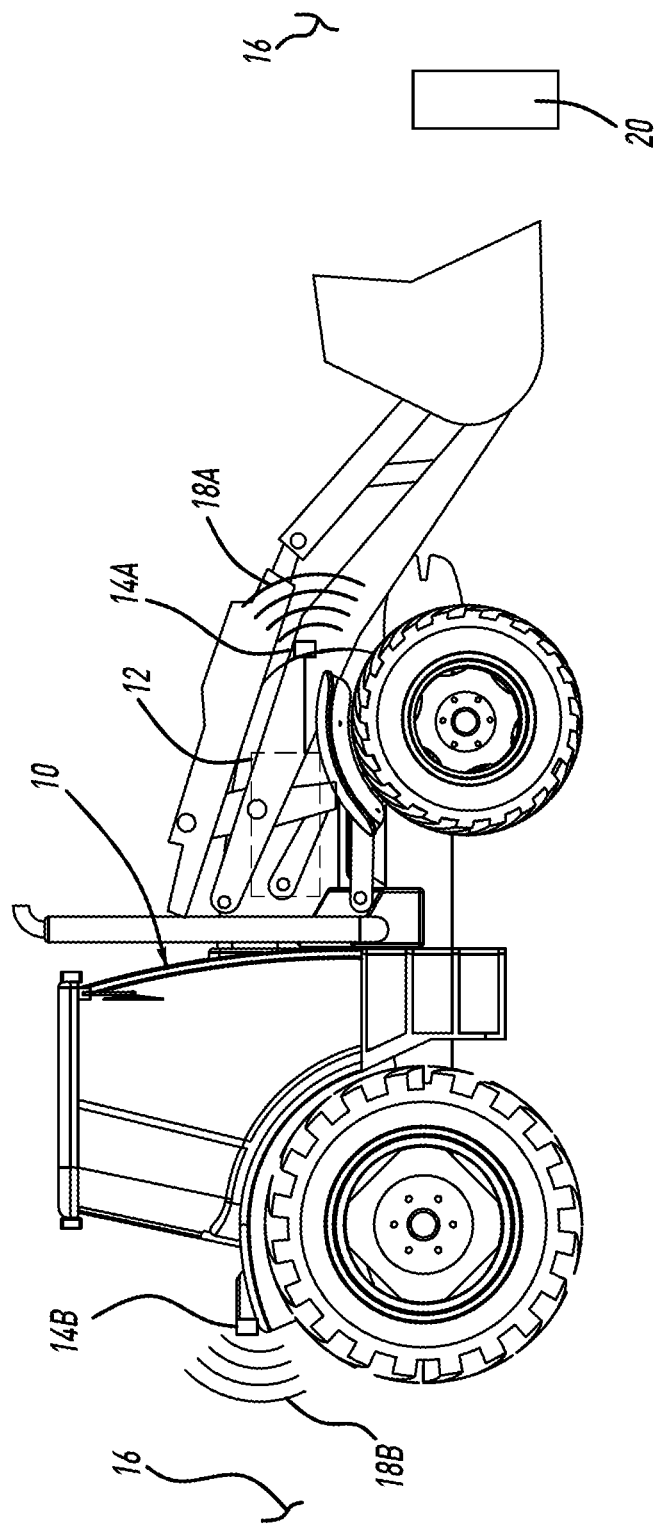

Referring to FIG. 1B, shown is another example of the vehicle 10. In this example, the vehicle 10 has a shovel accessory 21 attached to the vehicle 10. The shovel accessory 21 is generally removably attached to the vehicle 10. As such, when the operator desires to move dirt or snow or other material, the operator can have the shovel accessory 21 attached to the vehicle 10. Referring to FIG. 1C, another example of the vehicle 10 is shown. In this example, attached to the vehicle 10 is a backhoe accessory 22. As such, the backhoe accessory 22 is removably attached to the vehicle 10 and may be added or removed by the operator based on the needs of the operator.

Figure 1D:
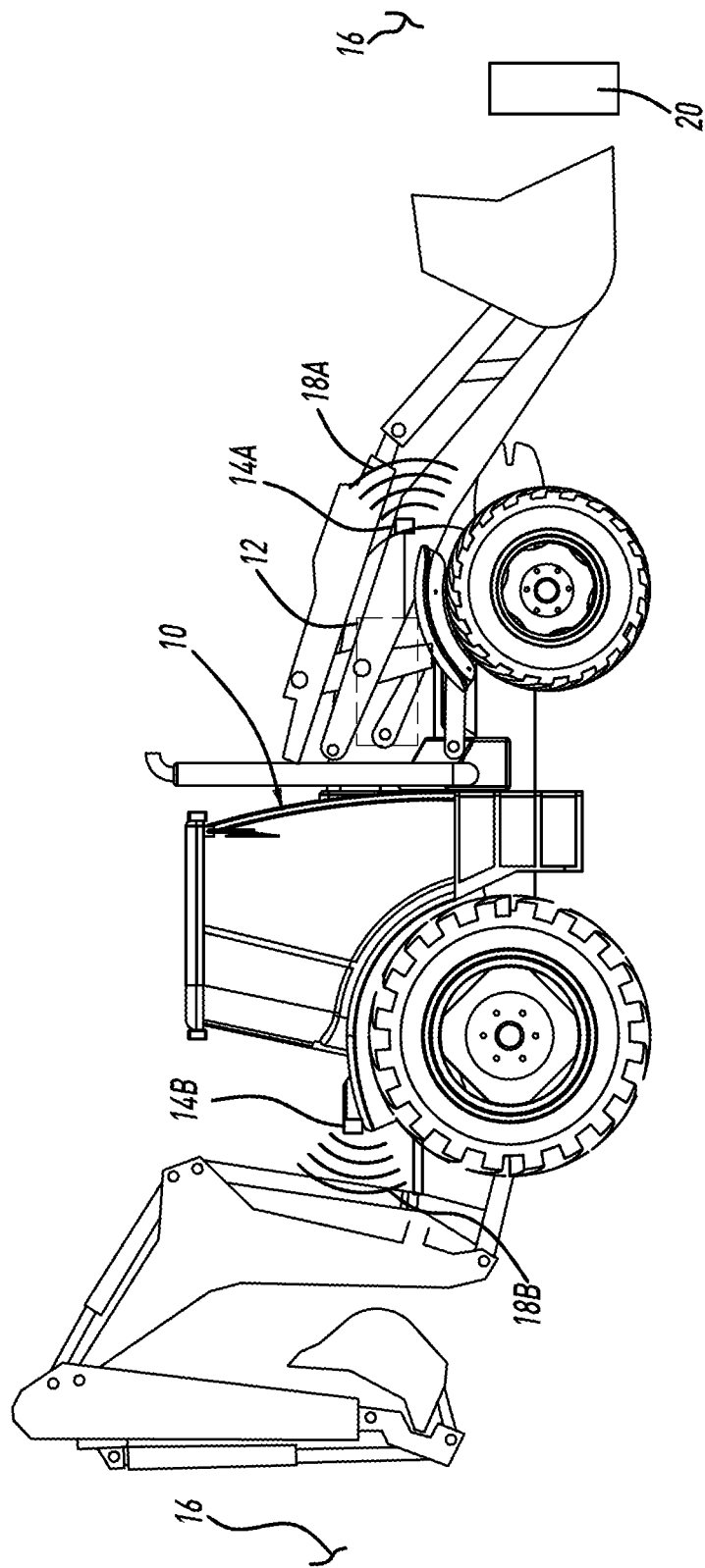

Finally, referring to FIG. 1D, yet another example of the vehicle 10 is shown. In this example, the vehicle 10 includes both the shovel accessory 20 and the backhoe accessory 22 attached to the vehicle 10. As mentioned briefly in the background section, one problem with attaching one or more accessories to a vehicle involves that the accessories could be detected by the sensors 14A and/or 14B. Prior art systems, when detecting the attached accessories would provide notice to an operator that an external object is located in the area that the vehicle is operating in. However, as will be explained in the paragraphs that follow, the system 12 has both a learning mode and an operating mode, when the system 12 can learn the location of the accessories 21 and/or 22 so as to prevent the false reporting of objects.

Figure 2A:
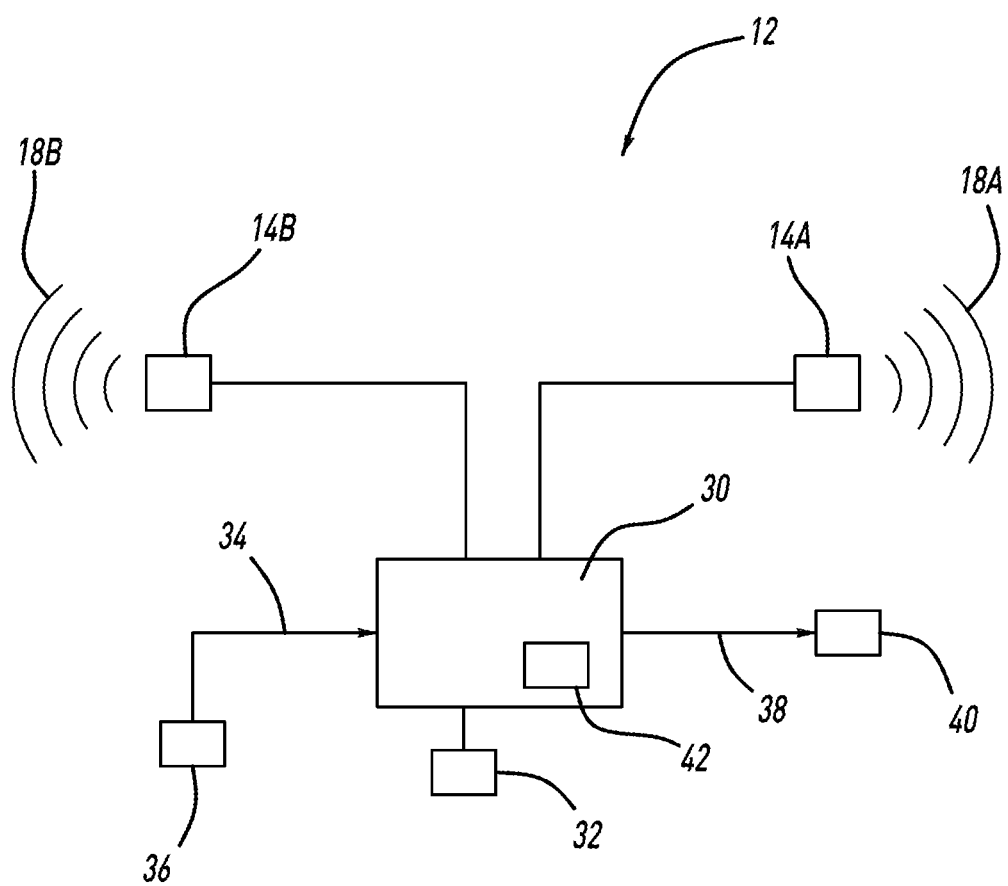
FIGS. 2A and 2B illustrate block diagrams of different examples of the system for configuring one or more sensors of a vehicle.

Referring to FIG. 2A one example of the system 12 is shown. In this example, the system 12 includes sensors 14A and 14B that as previously mentioned can transmit and receive signals 18A and 18B respectively. As mentioned before, the system 12 may include any one of a number of sensors and any one of a number of different types of sensors. The system 12 also includes a processor 30 that is in communication with the sensors 14A and 14B. The processor may be a single processor may be multiple processors working in concert to receive signals from the sensors 14A and 14B. The processor 30 is configured to receive signals from the sensors 14A and 14B and, based on these received signals, be able to determine the location of any objects external to the vehicle 10.

The processor 30 may be in communication with a memory device 32. The memory device 32 may be any type of memory device capable of storing digital information. For example, the memory device may be a solid-state memory device, magnetic device, or optical device. Furthermore, the memory device 32 may be incorporated within the processor 30 or may be separate as shown.

In addition to receiving signals from the sensors 14A and 14B, the processor is also configured to receive a triggering signal 34. The triggering signal 34, as will be explained later, initiates the learning mode for the system 12. The triggering signal 34 may be initiated by an input device 36. For example, the input device 36 may be a button or switch that can be actuated by the operator of the vehicle 10. This actuation of the button or switch then sends the signal 34 to the processor 30. The input device 36 could also be a device that detects when the vehicle 10 starts up. When the vehicle 10 starts up, the triggering signal 34 could be initiated. This example could be advantageous because it would require that the learning mode is entered into every time the vehicle 10 starts up.

It should be understood that the device 36 being a button, switch or associated with the startup of the vehicle 10 are merely but a few examples. The device 36 could be any device capable of accepting input. For example, the device 36 could also be a remote device, such as a mobile phone or tablet that is capable of sending the signal 34 to the processor 30 either wired or wirelessly. Additionally, the device 36 could be a sensor that senses when an accessory, like the shovel accessory 21 or the backhoe accessory 22, is attached and/or removed from the vehicle 10. When the accessory is attached or removed from the vehicle 10, the device 36 would then send the signal 34 to the processor 30.

In the event that the processor 30 determines that an external object is a valid target (an object the operator of the vehicle 10 should be informed about that generally does not include the attached accessory to the vehicle 1), the processor 30 is configured to send a signal 38 to a device that may be external from the system 12. Here, the device 40 is another vehicle system that may relay the detection of a valid target to the operator through some form of audible, visual, and/or tactile feedback. Additionally, the device 40 may be a vehicle safety system that is capable of controlling the vehicle 10 so minimize contact with the valid target. This control of the vehicle 10 could include steering or braking of the vehicle 10 so as to prevent or minimize any collision with a valid target.

As will be explained in the paragraphs that follow, the processor 30 may be configured with a set of instructions 42 for executing the method later described. The instructions 42 may be stored within the processor 30 or may also be stored externally, such as in the memory device 32.

Figure 2B:
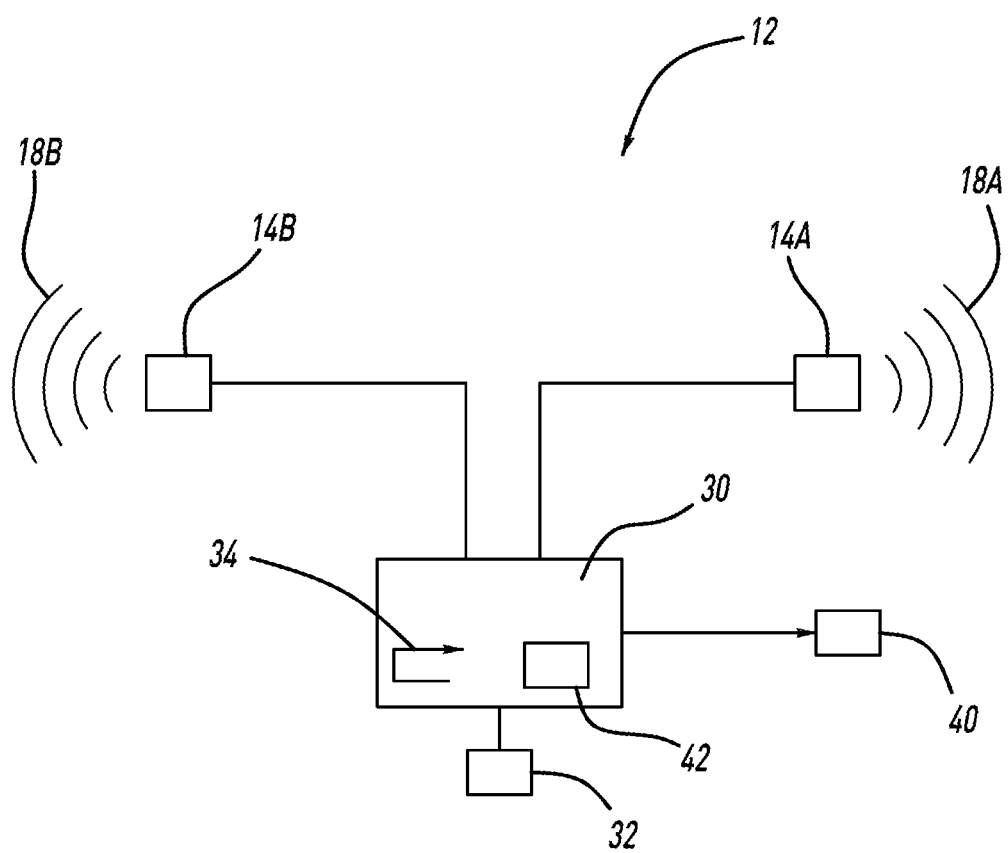

Referring to FIG. 2B, another example of the system 12 is shown. In this example, the triggering signal 34 is initiated by the processor 30 such that the processor 30 controls when the triggering signal is generated.

Figure 3:
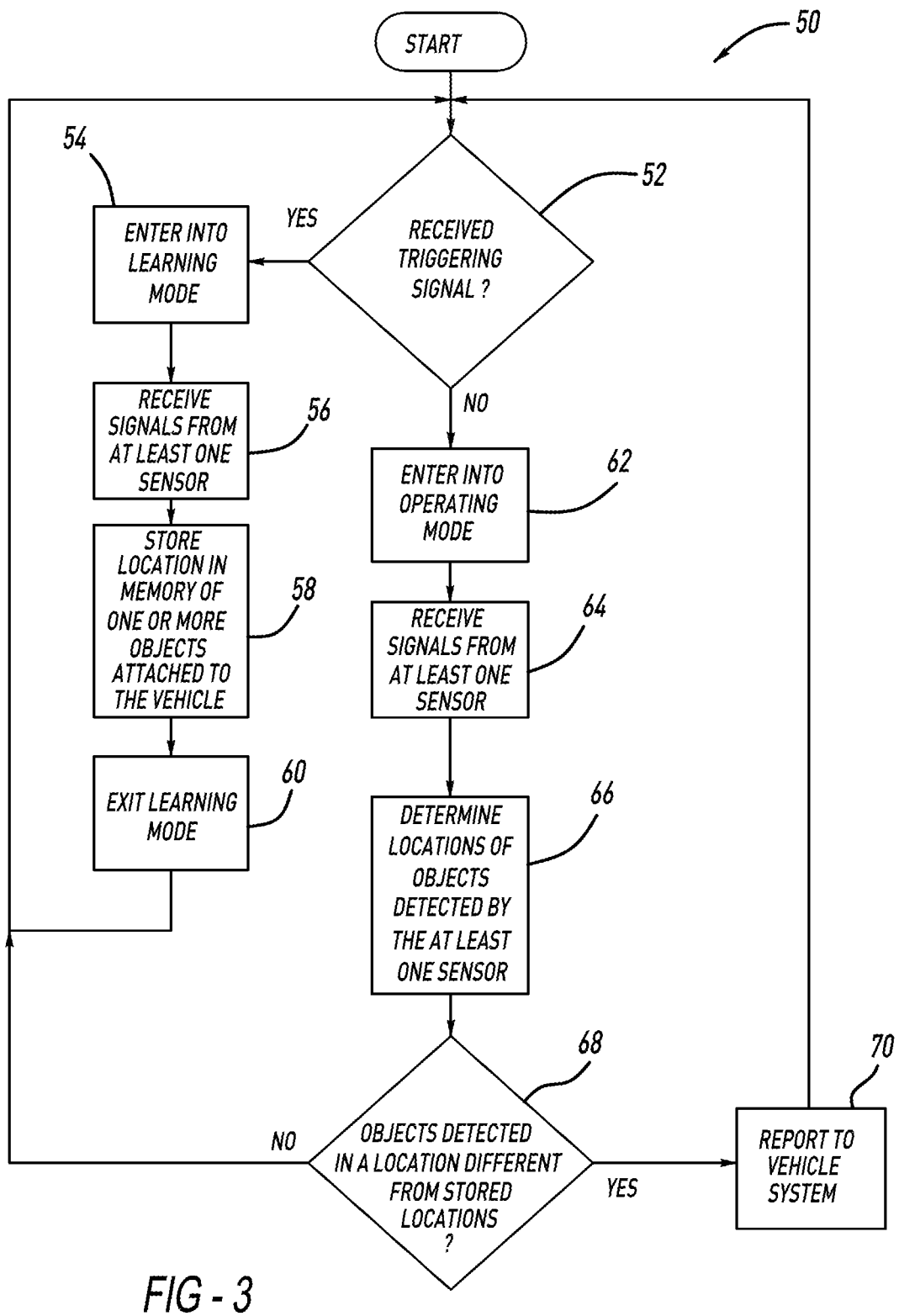
FIG. 3 illustrates a method for configuring one or more sensors of the vehicle.

Referring to FIG. 3, a method 50 for configuring the sensor system 12 of the vehicle 10 is shown. The method 50 begins by first determining if the triggering signal 34 has been received, as shown in step 52. In the case that a triggering signal 34 has been received, the method 50, in step 54, enters into a learning mode. The learning mode essentially allows the system 12 to learn the locations of any accessories or objects attached to the vehicle 10. For example, as illustrated in the earlier figures, the objects attached to the vehicle 10 could include a shovel accessory 21 or a backhoe accessory 22.

In step 56, the processor 30 receives signals from the sensors 14A and/or 14B. In step 58, the processor 30 stores the location of the one or more objects attached to the vehicle in the memory device 32. After that, in step 60, the method 50 exits the learning mode.

After exiting the learning mode, the method 50 may then proceed to enter into an operating mode, as shown in step 62. Generally, the operating mode is the mode in which the vehicle operates when under regular use. Furthermore, the operating mode may be entered into if no triggering signal is received in step 52.

During the operating mode, the processor 30 receives signals from at least one of the sensors 14A and/or 14B as shown in step 64.

In step 66, the processor 30 determines the locations of the objects detected by the at least one sensor 14A and/or 14B. In step 68, the processor 30 then determines if the objects detected in the operating mode are in a location different from the stored locations that were stored in the learning mode. If the objects detected are in the same location, these objects are most likely the objects that were attached to the vehicle. In such a case, the method 50 returns to step 52.

In such a case that an object is detected with a different location from the stored locations, the method 50 proceeds to step 70 where the processor reports to the vehicle system 40 regarding detection of an external object. The vehicle system 70 may then provide some form of feedback to the operator or may actuate one or more safety systems to prevent or minimize a collision with the external object. Thereafter, the method 50 returns to step 52.

It should be understood that when a method 50 is in the learning mode 54, the vehicle 10 may be parked or may be moving. In a case where the vehicle is moving, the processor 30 may receive signals from the sensors 14A and/or 14B regarding one or more objects in the area 16 in which the vehicle 10 is located. In one example, the vehicle 10 having the system 12 may be in an environment that does not have any real targets near the sensors 14A and/or 14B during the learning mode. This prevents the system 12 from inadvertently considering real targets, such as people or other vehicles, as being an object that is attached to the vehicle 10.

However, it should be additionally understood that the system 12 could include additional software so as to be able to prevent real targets that are located in the environment during the learning mode from being considered as an object that is attached to the vehicle 10. For example, during the learning mode, the vehicle 10 may be moved around so that the system 12 could distinguish which objects are truly attached to the vehicle 10 in which objects are simply located in the environment.

The processor 30 may determine which objects in the area are attached to the vehicle and which objects are not attached to the vehicle. Thereafter, the processor 30 will store in the memory device 32 the location of the objects attached to the vehicle. Furthermore, some original equipment manufacturers require sending a message, such as a controller area network message, to a bus of the vehicle 10 to notify other controllers when an external object is attached or removed from the vehicle 10. However, it should be understood that this is not always the case, especially with vehicles that do not utilize this form of communication infrastructure.

Figure 4A:
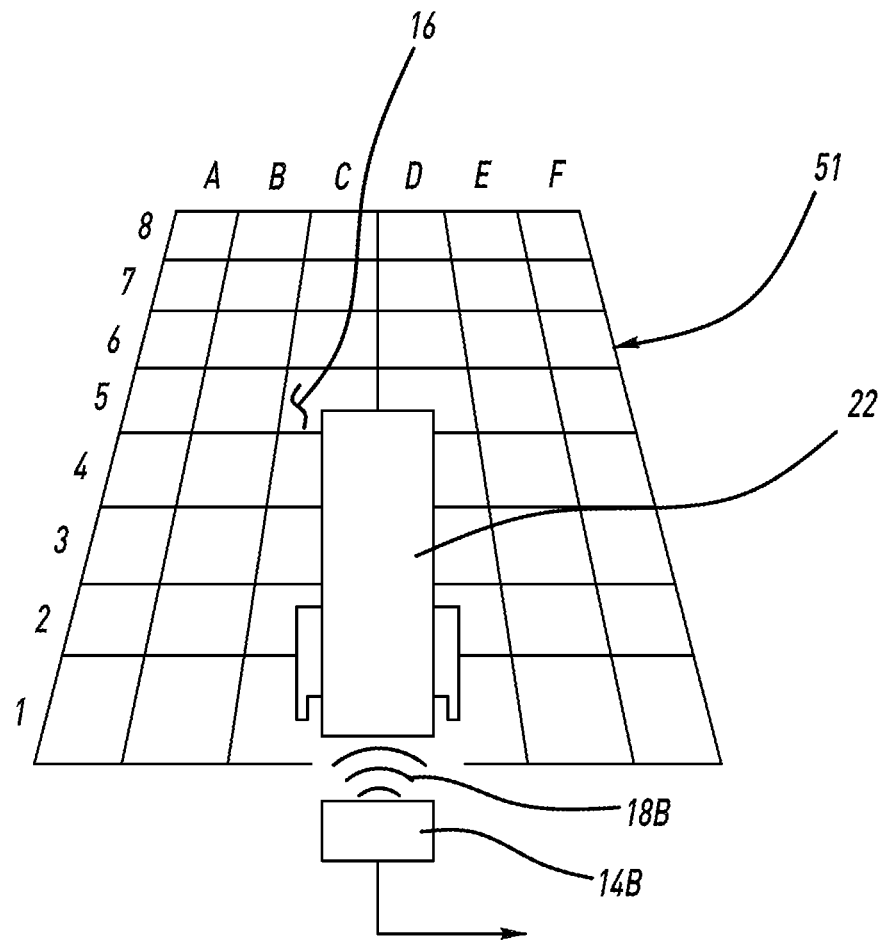
FIGS. 4A-4C illustrate two-dimensional data structures that may be utilized with the system and method for configuring one or more sensors of the vehicle.

Referring to FIG. 4A, there are numerous ways in which the location of objects attached to the vehicle, such as backhoe 22, could be stored in the memory. Here, a two-dimensional data structure in the form of a grid 51 is shown. The grid 51 includes a plurality of grid elements along rows labeled 1-8 and columns labeled A-F. In this example, the grid 51 is a representation of the area 16 external to the vehicle and detected by the sensor 14B.

Figure 4B:
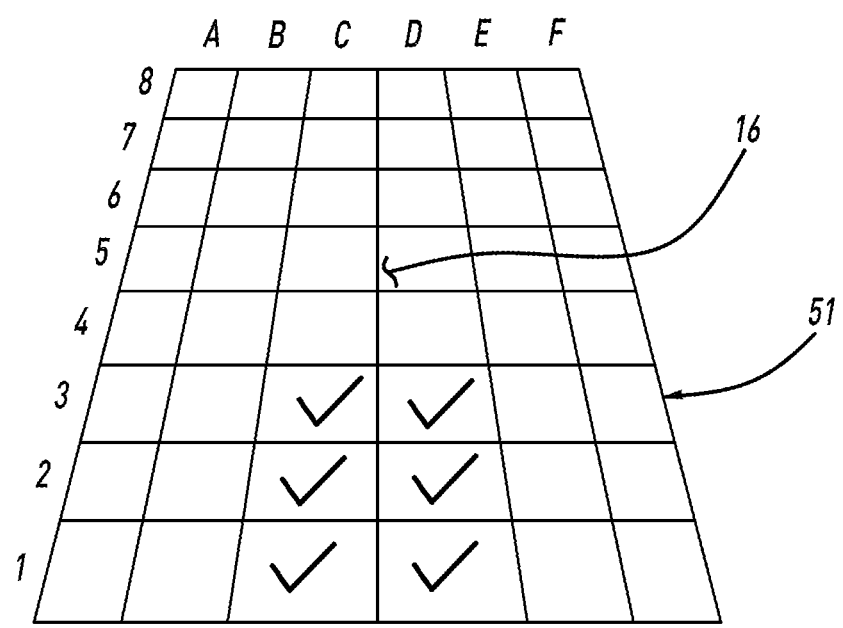

During the learning mode, the sensor 14B provides signals to the processor 30, as stated previously. The processor 30 may store the location of the backhoe 22 in the memory of the device 32 by utilizing the two-dimensional data structure grid 51. For example, as shown in FIG. 4B, grid elements 1C, 1D, 2C, 2D, 3C, and 3D all contain a checkmark. This checkmark is a visual representation of storing in the memory device 32 which grid elements, which are a representation of the area 16 in which the vehicle operates, as containing the backhoe 22. In the operating mode, if any objects are detected in the other grid elements that are not marked, the processor 30 will then inform the vehicle system that an object is present in the grid element is not attached to the vehicle.

Figure 4C:
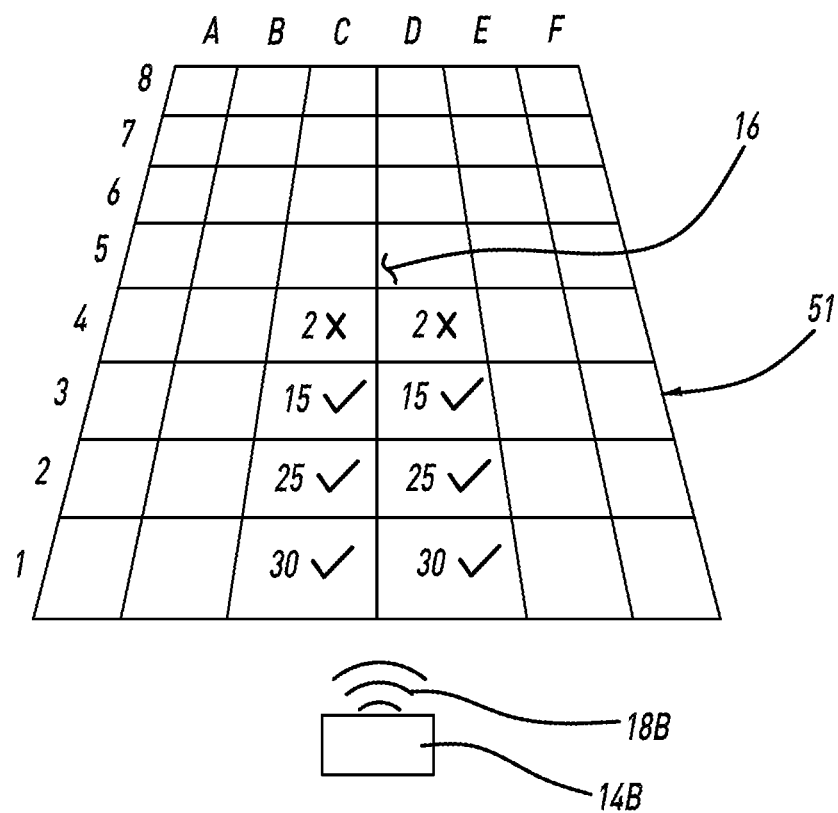

FIG. 4C shows another methodology for marking multiple grid elements. In this example, the sensor 14B scans the area 16 multiple times. The processor 30 then counts every time a grid element is determined to have an object located within. Each grid element would have an associated count indicator indicating the number of counts. In the learning mode, if an object is determined over a pre-determined number of times, the grid element is marked as containing an object that is attached to the vehicle.

For example, assume that the sensor 14B performs 30 scans in the area 16. Elements 1C and 1D each were determined to have an object located in the grid in 30 out of 30 scans. Grid elements 2C and 2D were determined to have an object located in these elements 25 out of 30 scans. In grid elements 3C and 3D, these grid elements were determined to have an object located within them 15 out of 30 scans. Finally, regarding elements 4C and 4D, these grid elements were determined to have an object present in only 2 of 30 scans. As such, the processor 30 could set a threshold amount, in this case, 15 or higher. If a grid element has a count that is above this threshold, it will be determined that this grid element contains an object that is attached to the vehicle. In this example, since the threshold has been set to 15 or higher, only elements 1C, 1D, 2C, 2D, 3C, and 3D are determined to have an object located within the grid element. As to grid elements 4C and 4D, since these grid elements had fewer than 15 counts, these grid elements are not marked to contain an object attached to the vehicle. These grid elements may have determined on only 2 of 30 occasions that an element is present because of a number of different factors, such as noise.

Figure 5:
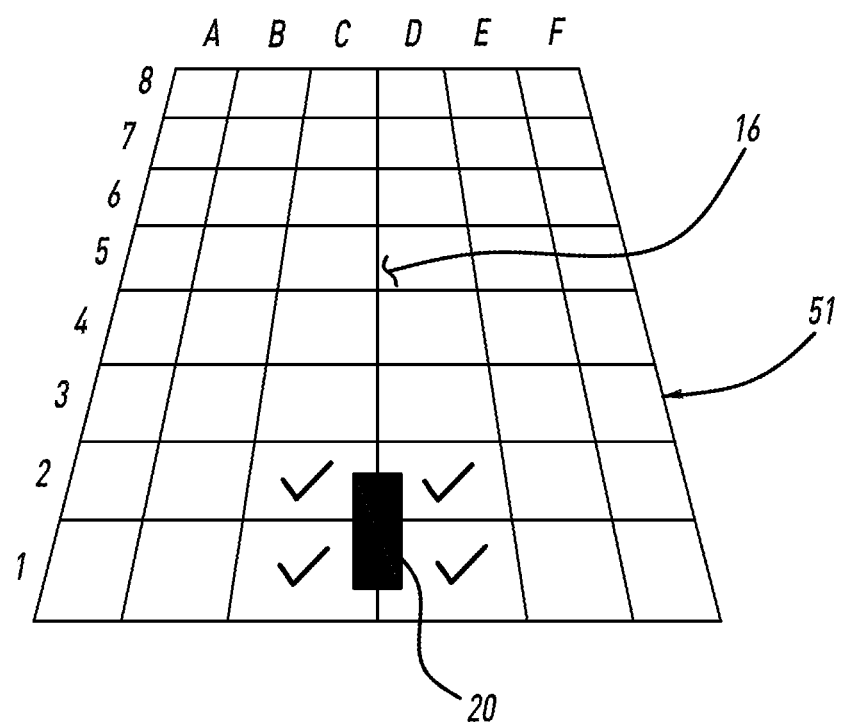
FIG. 5 illustrates a two-dimensional data structure having an object that overlaps grid elements of a two-dimensional data structure.

Referring to FIG. 5, there can be certain situations where an object, such as object 20 is located on the border of separate grid elements. In a case where an object 20 is located across the border of separate grid elements, such as case grid elements 1C, 1D, 2C, and 2D, all of the grid elements could be marked to indicate that an object is present. If count indicators are utilized, the processor 30 may be configured to increase the count indicators of the contiguous grid elements 1C, 1D, 2C, and 2D when one or more objects are present on a border between two areas that the grid elements represent.

Figure 6:
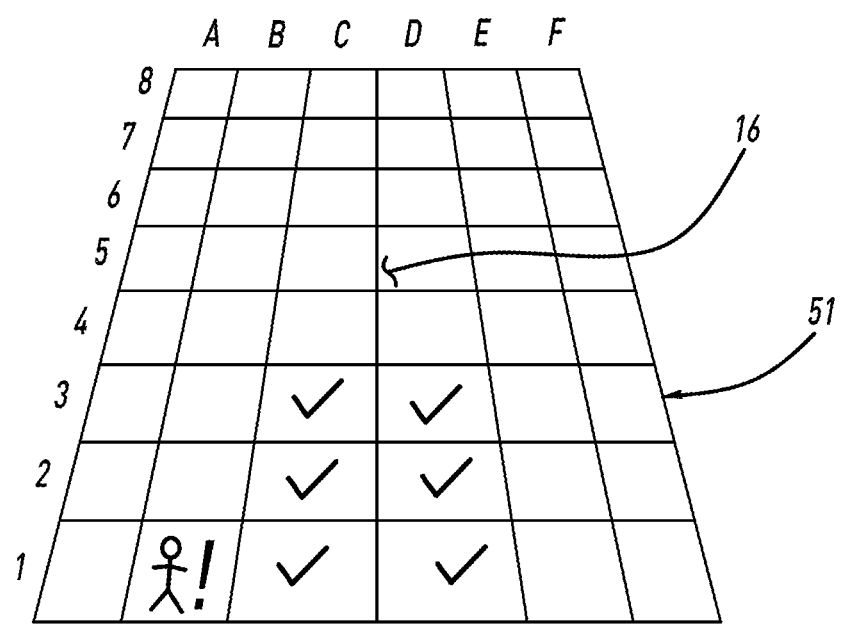
FIG. 6 illustrates a two-dimensional data structure in an operating mode.

As to FIG. 6, this figure illustrates the grid 51 during an operating mode. As stated before, elements 1C, 1D, 2C, 2D, 3C, and 3D were each marked as having an object attached to the vehicle located within. In this case, element 1B is determined to have an object that does not match the previous objects to be determined to be connected to the vehicle. In this case, since there is an object located in grid element 1B, the processor 30 would report this finding to the vehicle system.

Figure 7A:
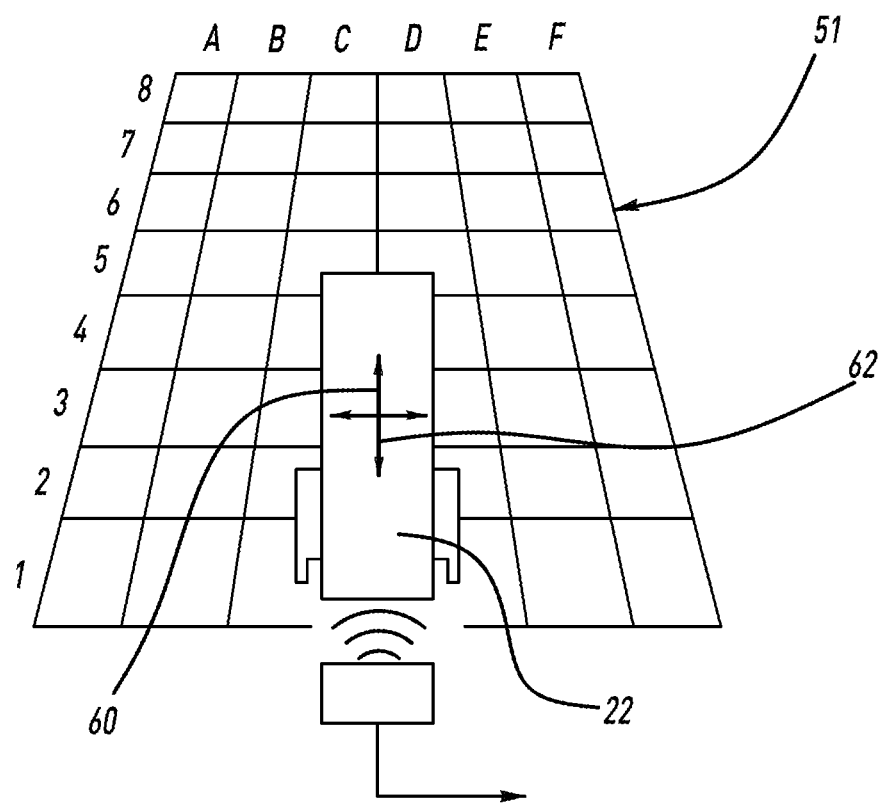
FIGS. 7A and 7B illustrate two-dimensional data structures utilizing a learning mode where the vehicle and/or accessory is moved during the learning mode.
Figure 7B:
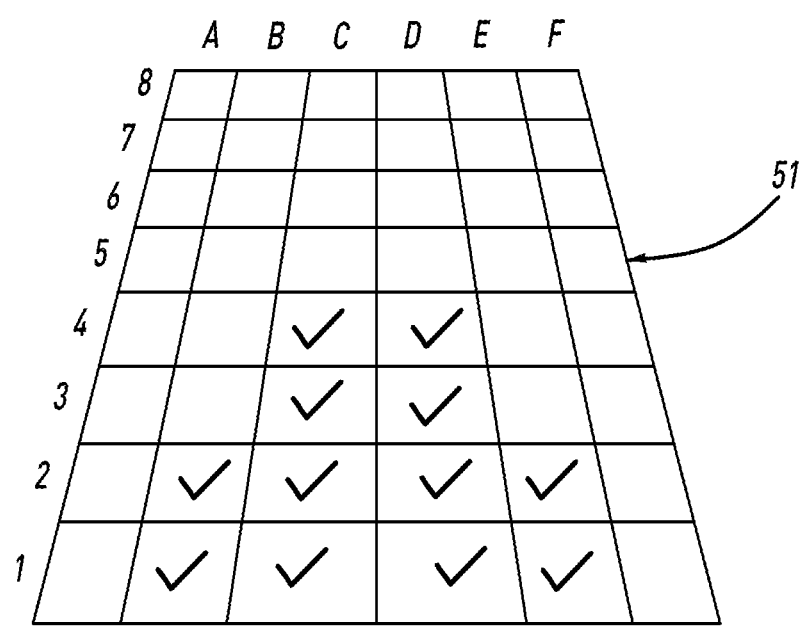

FIGS. 7A and 7B illustrate another methodology for marking the gird elements of the grid 51. In this case, the backhoe 22 is allowed, during the learning mode, to move in a variety of different directions as indicated by arrows 60 and 62. The processor 30 during the learning mode, can then mark additional grid elements that the backhoe 22 may be located within when the backhoe is moving around. As such, as best shown in FIG. 7B, in addition to the elements previously marked, elements 4C, 4D, 2B, 2E, 1B, and 1E are marked in addition to those elements previously mentioned. As such, these additional grid elements will be added to the stored locations. Objects that are detected that are not the same as these stored locations will cause the processor 30 to inform the other vehicle system of the presence of these external objects.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system for configuring at least one sensor system of a vehicle, the system comprising:
   a processor;
   at least one sensor in communication with the processor, the at least one sensor configured to detect one or more objects in an area external to the vehicle;
   a memory device in communication with the processor; and wherein the processor is configured to:
   detect a triggering signal,
   upon detecting the triggering signal, entering into a learning mode, wherein the processor receives signals from the at least one sensor regarding one or more objects attached to the vehicle,
   during the learning mode, store in the memory device at least one location of the one or more objects attached to the vehicle in the memory and detected by the at least one sensor,
   exit the learning mode and enter into an operating mode,
   during the operating mode, the processor is configured to receive signals from the at least one sensor regarding the location of the one or more objects external to the vehicle,
   during the operating mode, the processor is configured to determine one or more locations of one or more objects external to the vehicle, and
   during the operating mode, report to a vehicle system when the one or more objects external to the vehicle have a one or more locations different from the locations of the one or more objects attached to the vehicle and stored in the memory device during the learning mode.

2. The system of claim 1, wherein the at least one sensor is a radar sensor.

3. The system of claim 1, wherein the at least one sensor is a camera.

4. The system of claim 1, wherein the triggering signal is initiated by a startup of the vehicle.

5. The system of claim 1, wherein the triggering signal is initiated by an input device adapted to be actuated by an operator of the vehicle.

6. The system of claim 1, wherein the triggering signal is initiated after an external device is attached or removed from the vehicle.

7. The system of claim 1, wherein the processor is further configured to:
   wherein, during the learning mode and while the vehicle is moving, receives signals from the at least one sensor regarding one or more objects in the area,
   wherein, during the learning mode, determine which of the one or more objects in the area are attached to the vehicle and which objects are not attached to the vehicle, and
   during the learning mode, store in the memory device at least one location of one or more objects attached to the vehicle in the memory and detected by the at least one sensor.

8. The system of claim 1, wherein the processor is further configured to:
- create a two-dimensional data structure, the two-dimensional data structure being a grid having a plurality of grid elements, the grid being a representation of the area external to the vehicle and detected by the at least one sensor;
- during the learning mode, receive signals from the at least one sensor of the area external from the vehicle and mark the grid elements of the grid with an indicator when the one or more objects attached to the vehicle are present in the area of the grid that the grid elements represents;
- during the operating mode, receive signals from the at least one sensor of the area external from the vehicle and determine when at least one object is present in the area where a grid element is unmarked; and
- during the operating mode, report to the vehicle system when at least one object is present in the area where a grid element of the plurality of grid elements is unmarked.

9. The system of claim 8, wherein the processor is configured to:
- during the learning mode, receive signals from the at least one sensor of a plurality of scans of the area external from the vehicle during each scan and increment a count indicator that one or more objects are present in the area that the grid element represents;
- wherein the count indicator is increased each time the one or more objects are present during each scan in the area that the grid element represents; and
- during the learning mode, mark the grid elements of the grid with the indicator when the count indicator reaches a threshold amount.

10. The system of claim 9, wherein the processor is configured to increase the count indicators of two contiguous of the grid elements when one or more objects are present on a border between two areas that the grid elements represent.

11. A method for configuring at least one sensor system of a vehicle, the method comprising the steps of:
- detecting a triggering signal;
- upon detecting the triggering signal, entering into a learning mode;
- during the learning mode, receiving signals from the at least one sensor regarding one or more objects attached to the vehicle;
- during the learning mode, moving by the vehicle the one or more objects attached to the vehicle and determining using the at least one sensor the at least one location of the one or more objects attached to the vehicle based on moving the one or more objects;
- during the learning mode, storing in a memory device at least one location of one or more objects attached to the vehicle in the memory and detected by the at least one sensor,
- exiting the learning mode and entering into an operating mode;
- during the operating mode, receiving signals from the at least one sensor regarding the location of one or more objects external to the vehicle;
- during the operating mode, determining if the location of any of the objects external to the vehicle are different from the locations of any objects attached to the vehicle and stored in the memory device during the learning mode; and
- during the operating mode, reporting to a vehicle system when the one or more objects external to the vehicle have a one or more locations different from the locations stored in the memory device during the learning mode.

12. The method of claim 11, wherein the at least one sensor is a radar sensor.

13. The method of claim 11, wherein the at least one sensor is a camera.

14. The method of claim 11, wherein the triggering signal is initiated by a startup of the vehicle.

15. The method of claim 11, wherein the triggering signal is initiated by an input device actuated by an operator of the vehicle.

16. The method of claim 11, wherein the triggering signal is initiated after an external device is attached or removed from the vehicle.

17. The method of claim 11, further comprising the steps of:
- wherein, during the learning mode and while the vehicle is moving, receiving signals from the at least one sensor regarding one or more objects in the area;
- wherein, during the learning mode, determining which of the objects in the area are attached to the vehicle and which objects are not attached to the vehicle; and
- during the learning mode, storing in the memory device at least one location of one or more objects attached to the vehicle in the memory detected by the at least one sensor.

18. The method of claim 11, further comprising the steps of:
- creating a two-dimensional data structure, the two-dimensional data structure being a grid having a plurality of grid elements, the grid being a representation of the area external to the vehicle and detected by the at least one sensor;
- during the learning mode, receiving signals from the at least one sensor of the area external from the vehicle and mark the grid elements of the grid with an indicator when the one or more objects attached to the vehicle are present in the area the grid represents, wherein the grid elements are marked based on movement of the one or more objects attached to the one or more objects attached to the vehicle during the learning mode;
- during the operating mode, receiving signals from the at least one sensor of the area external from the vehicle and determine when at least one object is present in the area where a grid element is unmarked; and
- during the operating mode, reporting to the vehicle system when at least one object is present in the area where the grid elements are unmarked.

19. The method of claim 18, further comprising the steps of:
- during the learning mode, receiving signals from the at least one sensor of a plurality of scans of the area external from the vehicle during each scan and increment a count indicator that one or more objects are present in the area the grid element represents;
- increasing the count indicator each time one or more objects are present during each scan in the area the grid element represents; and
- during the learning mode, marking the grid elements with the indicator when the count indicator reaches a threshold amount.

20. The method of claim 19, further comprising the step increasing the count indicators of two contiguous of the grid elements when one or more of the objects are present on a border between two areas that the grid elements represent.

* * * * *